Nov. 13, 1928.
F. W. ZINK
1,691,323
SUPPORT FOR REAR VIEW MIRRORS
Filed March 23, 1926
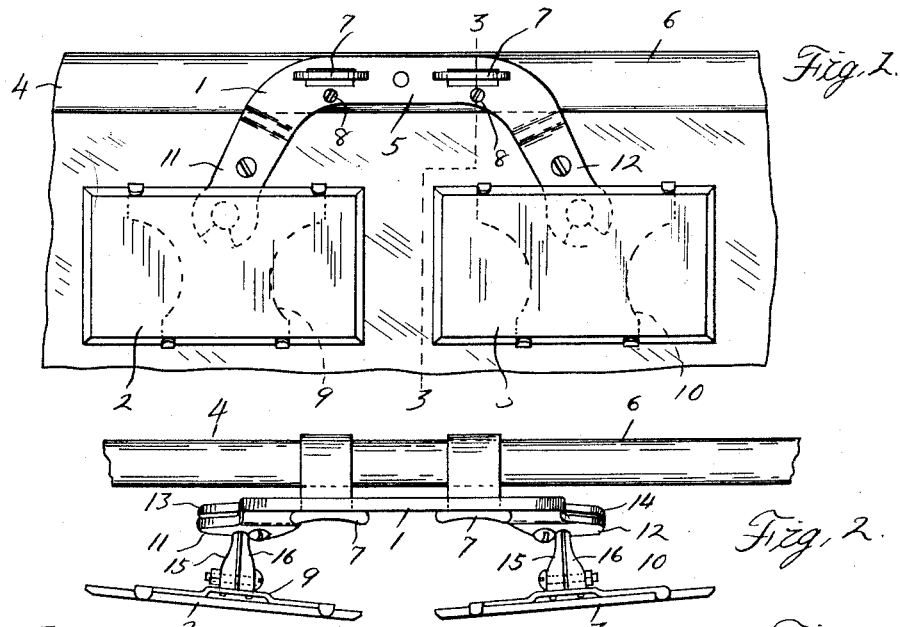
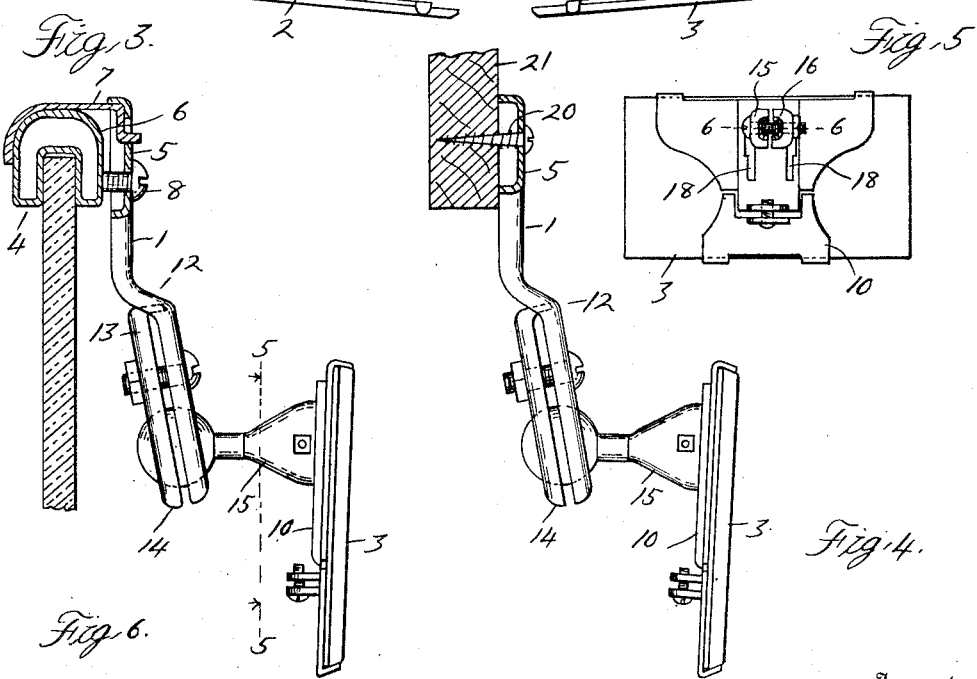
Inventor
Fred W. Zink Patented Nov. 13, 1928.

1,691,323

UNITED STATES PATENT OFFICE.

FRED W. ZINK, OF DETROIT, MICHIGAN, ASSIGNOR TO KALES STAMPING COMPANY, OF DETROIT, MICHIGAN, A CORPORATION OF MICHIGAN.

SUPPORT FOR REAR-VIEW MIRRORS.

Application filed March 23, 1926. Serial No. 96,710.

This invention relates generally to supports for rear view mirrors designed for use on motor vehicles and the like.

One of the essential objects of the invention is to provide a support of this type that may be readily mounted on standard parts of open or closed vehicles and that is capable of holding a plurality of mirrors in various adjusted positions.

Another object is to provide a strong and durable support that is simple in construction and may be manufactured at a comparatively low cost.

With the above and other objects in view, the invention resides in certain novel features of construction, combinations and arrangements of parts as will be more fuly described and particularly pointed out in the appended claim.

In the accompanying drawing:

Figure 1 is a rear elevation of a construction embodying my invention.

Figure 2 is a fragmentary top plan view.

Figure 3 is a sectional view taken on the line 3—3 of Fig. 1.

Figure 4 is a view similar to Figure 3 but showing the mirror mounted on the windshield header of a closed body.

Figure 5 is a sectional view on the line 5—5 of Figure 3.

Figure 6 is a view on line 6—6 of Fig. 5.

Referring now to the drawing, 1 is a bracket embodying my invention supporting a pair of laterally spaced mirrors 2 and 3 respectively upon the windshield frame 4 of a motor vehicle. As shown, this bracket is substantially U-shape in form and is arranged in inverted position with the base 5 of the U extending along the top rail 6 of the windshield frame. With this construction the base 5 is preferably detachably secured to the top rail 6 by clips 7 and screws 8 as set forth in detail in a copending application bearing Serial No. 13,331, filed jointly in the names of J. F. Whitehead and myself. Likewise the mirrors 2 and 3 respectively are provided with holders 9 and 10 respectively and are adjustably supported from the depending diverging arms 11 and 12 respectively and cooperating jaw members 13 and 14 by the complementary arm members 15 and 16 respectively as set forth in the copending application referred to above. As shown in the accompanying drawing, the slots 18 in the holders 9 and 10 afford relative sliding adjustments between the mirrors 2 and 3 and the complementary arm members 15 and 16 whereby either mirror may be adjusted vertically without disturbing the connection with the windshield frame 4. Furthermore the mirrors 2 and 3 respectively may be inclined at any angle or rotated in their respective planes through 360° by the provision of the universal ball and socket connections at A and B respectively. Hence a very wide range of adjustments is provided.

Inasmuch as such vertical and universal adjustments are provided for the laterally spaced mirrors 2 and 3 respectively it will be readily apparent that these mirrors may be adjusted relative to each other to give two lines of vision for the driver or one may be adjusted for the driver and the other adjusted for the passenger in the front seat beside the driver.

If desired, the clips 7 may be engaged with a side rail of the windshield frame or any other upright rod on the vehicle to support the mirrors 2 and 3 respectively at one side of the vehicle or the clips 7 and screws 8 may be dispensed with and the base 5 may be attached by screws 20 directly to the windshield header 21 of a closed car (see Fig. 4). Hence a full rear vision may be obtained on any car, open or closed all the way back to the horizon, irrespective of whether the rear window light is high or low.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

In combination, a pair of laterally spaced mirrors, a pair of holders secured to said mirrors, arms projecting at substantially right angles from said holders, an inverted substantially U-shaped bracket having the base of the U attachable to the top rail of a windshield, said frame, and having the arms of the U extending downwardly adjacent said holders, and jaw members respectively secured to the arms of said U-shaped frame and claiming the arms aforesaid against the said arms of said U-shaped bracket.

In testimony whereof I affix my signature.

FRED W. ZINK.